No. 707,298. Patented Aug. 19, 1902.
A. B. CASE.
BALL BEARING FOR LAWN MOWERS.
(Application filed June 28, 1901.)
(No Model.)

Witnesses:
J. D. Garfield
K. I. Clemons

Inventor:
Adelbert B Case
by Chapin &c
Attorneys

UNITED STATES PATENT OFFICE.

ADELBERT B. CASE, OF SPRINGFIELD, MASSACHUSETTS.

BALL-BEARING FOR LAWN-MOWERS.

SPECIFICATION forming part of Letters Patent No. 707,298, dated August 19, 1902.

Application filed June 28, 1901. Serial No. 66,380. (No model.)

*To all whom it may concern:*

Be it known that I, ADELBERT B. CASE, a citizen of the United States of America, residing at Springfield, in the county of Hampden and State of Massachusetts, have invented new and useful Improvements in Ball-Bearings for Lawn-Mowers, of which the following is a specification.

This invention relates to ball-bearing devices for lawn-mowers and other machines, the object being to provide improved means for preventing the derangement of the positions of the coöperating parts of said bearings due to the shocks produced by the frequent stopping and starting of the machine; and the invention consists in the peculiar construction and arrangement of certain of said ball-bearing parts, all as hereinafter fully described, and more particularly pointed out in the claims.

Figure 1:
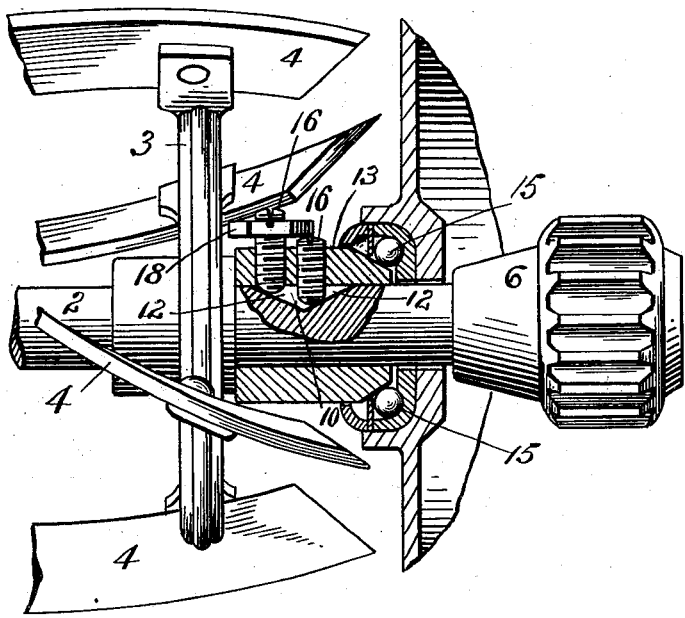
Figure 2:
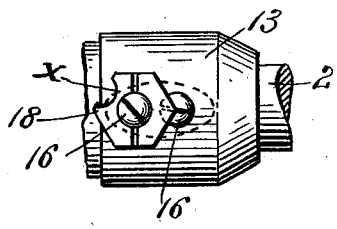

In the drawings forming part of this specification, Figure 1 is a side elevation, partly in section, showing a part of the knife-carrying shaft with a portion thereof broken away and parts of knives connected therewith, as usual, and illustrating in section the ball-bearing cone and means for adjusting and fixing the same on said shaft. Fig. 2 is a plan view of a portion of said shaft and of the cone thereon and of the cone-adjusting devices.

In the drawings, referring to Fig. 1, is illustrated the usual depression 10, formed in the side of the shaft 2, having inclined base-surfaces 12, against which bear the inner ends of the cone adjusting and locking screws 16 16, whereby the tapered end of the cone is rigidly held against the balls 15 of the shaft-bearing. The frequent loosening of said screws, due to the sudden and frequent reversal of the rotary movements of knives of the machine, has heretofore been a frequent source of annoyance to the user, and to obviate such inconvenience and to provide means for so interlocking said screws 16 after adjusting the same that neither can become loosened and the cone 13 be displaced the below-described device is applied to said screws, as shown. To one of said screws (the higher one) is applied a lock-nut 18, which may be turned for adjustment by either a wrench or a fork-shaped screw-driver. After said screws shall have been turned to proper positions to lock the cone 13, as in Fig. 1, so that it shall engage the bearing-balls 15, said lock-nut is firmly screwed down against the upper end of the lower screw, as there shown. Screwing down said nut, as just described, carries the edge thereof with sufficient force against said lower screw to cause the nut to be more or less "canted," and thereby it becomes so bound on the higher screw that it resists any action whereby it may become loosened, and hence said cone, so far as the action of the machine is concerned, is thereby fixed in proper operative position until again released by turning one of said screws. Should one wish to turn the screw, which is beneath and near the edge of the nut 18, as shown in Fig. 1, that may be done by using a screw-driver. To make it convenient to use the screw-driver, a curved recess $x$ is made in the edge of said nut. (See Fig. 2.) By turning said screw, as aforesaid, said nut and the screw on which it is are held with more or less force in an adjusted position, and consequently the cone 13 is held immovable on the shaft 2.

Having thus described my invention, what I claim, and desire to secure by Letters Patent of the United States, is—

1. In lawn-mowers the combination with the ball-bearing adjustable cone thereof, of two cone-adjusting screws therein and means connected with one of said screws whereby both are locked in non-rotatable positions, substantially as described.

2. In lawn-mowers the combination with the ball-bearing adjustable cone thereof, of two cone-adjusting screws therein, side by side, and a lock-nut on one of said screws whose edge extends over the end of the second one, for screw engagement therewith, whereby said nut becomes locked with both screws, substantially as described.

ADELBERT B. CASE.

Witnesses:
H. A. CHAPIN,
K. I. CLEMONS.